(12) United States Patent
Lee et al.

(10) Patent No.: US 7,926,100 B2
(45) Date of Patent: Apr. 12, 2011

(54) METHOD FOR PREVENTING UNAUTHORIZED CONNECTION IN NETWORK SYSTEM

(75) Inventors: Shih Ching Lee, Taipei (TW); Pei Chuan Liu, Taipei (TW)

(73) Assignee: Cameo Communications Inc. (TW)

( * ) Notice: Subject to any disclaimer, the term of this patent is extended or adjusted under 35 U.S.C. 154(b) by 970 days.

(21) Appl. No.: 11/798,313

(22) Filed: May 11, 2007

(65) Prior Publication Data

US 2008/0141359 A1 Jun. 12, 2008

(30) Foreign Application Priority Data

Dec. 10, 2006 (TW) .............................. 95146186 A (51) Int. Cl.
| | | |
|---|---|---|
| *G06F 17/00* | (2006.01) | |
| *G06F 7/04* | (2006.01) | |
| *G06F 12/14* | (2006.01) | |
| *G06F 11/30* | (2006.01) | |
| *G06F 15/173* | (2006.01) | |
| *G06F 15/16* | (2006.01) | |
| *H04L 29/06* | (2006.01) | |
| *H04L 9/32* | (2006.01) | |
| *H04L 9/28* | (2006.01) | |
| *H04L 9/00* | (2006.01) | |
| *H04K 1/00* | (2006.01) | |

(52) U.S. Cl. .................. 726/13; 726/4; 726/12; 726/14; 726/22; 713/153; 713/154; 713/161; 713/162; 713/165; 713/168; 713/171; 713/189; 380/255; 380/258; 380/43; 380/28; 709/224; 709/231; 709/232

(58) Field of Classification Search .......... 726/4, 12–14, 726/22; 713/153, 154, 161, 162, 165, 168, 713/171, 189; 380/255, 258, 43, 28; 709/224, 709/231, 232

See application file for complete search history.

(56) References Cited

U.S. PATENT DOCUMENTS

| | | | |
|---|---|---|---|
| 6,377,691 B1* | 4/2002 | Swift et al. ................... | 380/277 |
| 2006/0209719 A1* | 9/2006 | Previdi et al. ................. | 370/254 |
| 2007/0283045 A1* | 12/2007 | Nguyen et al. ................ | 709/245 |
| 2008/0022354 A1* | 1/2008 | Grewal et al. .................... | 726/1 |
| 2008/0112333 A1* | 5/2008 | Busch et al. .................. | 370/252 |
| 2009/0034540 A1* | 2/2009 | Law .............................. | 370/400 |
| 2009/0116505 A1* | 5/2009 | Bhatia et al. ................. | 370/419 |
| 2010/0039935 A1* | 2/2010 | Davison et al. ............... | 370/228 |
| 2010/0246439 A1* | 9/2010 | Heath et al. ................... | 370/254 |

\* cited by examiner

*Primary Examiner* — Aravind K Moorthy (57) ABSTRACT

A method for preventing unauthorized connection in a network system mainly includes adding an authentication key in the LLDP (link layer discovery protocol) transmitted in accordance with the 802.1ab communication protocol so as to proceed with security mechanism under the structure of 802.1ab communication protocol. The method for preventing unauthorized connection includes receiving a LLDP packet satisfying the 802.1ab communication protocol transmitted from a second network device by a first network device in a network system; analyzing the LLDP packet and checking whether the LLDP packet contains a legitimate authentication key; and if the authentication key does not exist or is illegitimate, then block all packets transmitted from the second network device so as to prevent the unauthorized second network device from using the network transmission service provided by the first network device.

9 Claims, 7 Drawing Sheets

Status Table of the LLDP Anti-Rogue and 802.1X

| | LLDP Anti-Rogue | 802.1X | Hardware |
|---|---|---|---|
| Initial Status | Block | Block | Block |
| LLDP | Pass | - | Pass |
| 802.1X | - | Pass | Pass |
| LLDP Pass / 802.1X Block | Pass | Block | Pass |
| LLDP Block / 802.1X Pass | Block | Pass | Pass |

FIG. 6

Table of combined result of both LLDP Anti-Rogue and 802.1X

| LLDP Anti-Rogue | 802.1X | Meaning |
|---|---|---|
| Disable | Disable | Force authenticated |
| Disable | Enable | Unauthorized |
| Disable | OK | Authorized by 802.1X |
| Enable | Disable | Unauthorized |
| Enable | Enable | Unauthorized |
| Enable | OK | Authorized by 802.1X |
| OK | Disable | Authorized by LLDP |
| OK | Enable | Authorized by LLDP |
| OK | OK | Authorized by both LLDP and 802.1X |

METHOD FOR PREVENTING UNAUTHORIZED CONNECTION IN NETWORK SYSTEM

BACKGROUND OF INVENTION

1. Field of the Invention

The present invention relates to a method for preventing unauthorized connection in a network system; particularly, the present invention relates to a method for preventing unauthorized connection in a network system that utilizes an authentication key in a LLDP packet transmitted in accordance with the 802.1ab communication protocol in a LAN so as to achieve the security mechanism for connection authentication.

2. Description of the Prior Art

As people have higher demands in the accessibility of information as well as vast quantity of data transmission, network communication has become an important technology in daily life of human.

With respect to an area network communication system, user is capable of acquiring information from a host computer at any remote location where network connection is applicable. Due to the fact that, the modern technology allows the speed of data transmission in the area network communication system to be as fast as 1 Giga bits per second, which eventually arises a risk that some unauthorized users might be able to connect to the area network communication system and download vast quantity of precious data without permission, or even hack into the system and make damages. As a result, how to prevent unauthorized network devices from illegitimately connecting to the data transmission service provided by the system is an important issue.

Currently, IEEE 802.1X communication protocol is the most commonly used security authentication mechanism in the local area network (LAN) under the IEEE 802 structure. The 802.1X standard uses user account or user device as the basis for network user (port) authentication. This type of authentication procedure is known as "port-level authentication", which divides the "Remote Authentication Dial-In User Service; RADIUS" into three parts: namely, requesting end (end user), authentication end and authentication server. When a terminal device, such as a computer, and the requesting end attempts to connect to other connection ports or devices, such as authentication end, the adoption of the 802.1X standard can complete the authentication and authorization task to the requesting end in the connection communication of the authentication server. However, the 802.1X standard only focuses on the authorization procedure and management, and does not impose restrictions on data encryption and computing method of the connection authentication. On the contrary, it defines periodic updates of encryption key and detailed procedures to further perform authentication.

The 802.1X standard indeed provides a good security authentication and authorization mechanism; however, it thus needs to perform more complex computation and authentication procedures. For a light-weighted network device, such as a dongle or a network card, it is thus limited to the hardware specification and computing power and may not be able to provide or support the 802.1X technology. Thus, it is necessary to provide a simplified authentication mechanism for network connections for this type of light-weighted network device.

With respect to 802.1X, IEEE 802.1ab communication protocol provides a simplified network communication mechanism, and is more suitable for light-weighted network devices that have limited hardware specification. However, conventional IEEE 802.1ab technology cannot provide authentication for network connection, nor can it prevent unauthorized network device from using the data transmission service provided by the system.

SUMMARY OF INVENTION

The first objective of the present invention is to provide a method for preventing unauthorized connection (that is, to Anti-Rogue) in a network system. The present invention provides authentication and licensing mechanism under the 802.1 ab communication protocol structure that is more suitable for portable network devices.

The second objective of the present invention is to provide a method for preventing unauthorized connection in a network system. The present invention adds an authentication key in the LLDP packet transmitted by the 802.1ab communication protocol. Utilizing the periodic LLDP packet broadcast function of the 802.1ab, network management device periodically checks for the authentication of each network device so as to prevent unauthorized network devices from connecting to the network system and from using the authentication and licensing mechanism of the information transmission service provided by the network device.

In order to achieve aforementioned objectives, this present invention provides a method for preventing unauthorized connection in a network system. An authentication key is added in the LLDP (link layer discovery protocol) transmitted in accordance with the 802.1ab communication protocol so as to proceed with security mechanism under the structure of 802.1ab communication protocol. The method includes the steps of: receiving a LLDP packet satisfying the 802.1ab communication protocol transmitted from a second network device by a first network device in a network system; analyzing the LLDP packet and checking whether the LLDP packet contains a legitimate authentication key; and if the authentication key does not exist or is illegitimate, then block all packets transmitted from the second network device so as to prevent the unauthorized second network device from using the network transmission service provided by the first network device.

This present invention also discloses a method for preventing unauthorized connection in a network system, which comprises the following steps:

configuring a content of a authentication key in a network device;

combining the license key into a LLDP packet compliant with an 802.1ab communication protocol; and broadcasting the LLDP packet via the 802.1ab communication protocol periodically so as to request other network device for a connection authentication.

Preferably, the LLDP comprises the following fields: a TLV title and a TLV data stream; the TLV data stream includes a MAC address of the network device and the authentication key is contained in the TLV data stream.

Preferably, the TLV title further includes a TLV type field and a TLV data length field; and the TLV data stream further includes an OUI field and an organization configuration subtype field and an organization configuration data stream field; wherein the authentication key encrypts an OUI code of a network device manufacturer with a password and then stores in the TLV data stream, and the password can be calculated by analyzing the TLV data stream of the LLDP packet.

DETAILED DESCRIPTION

Figure 1:
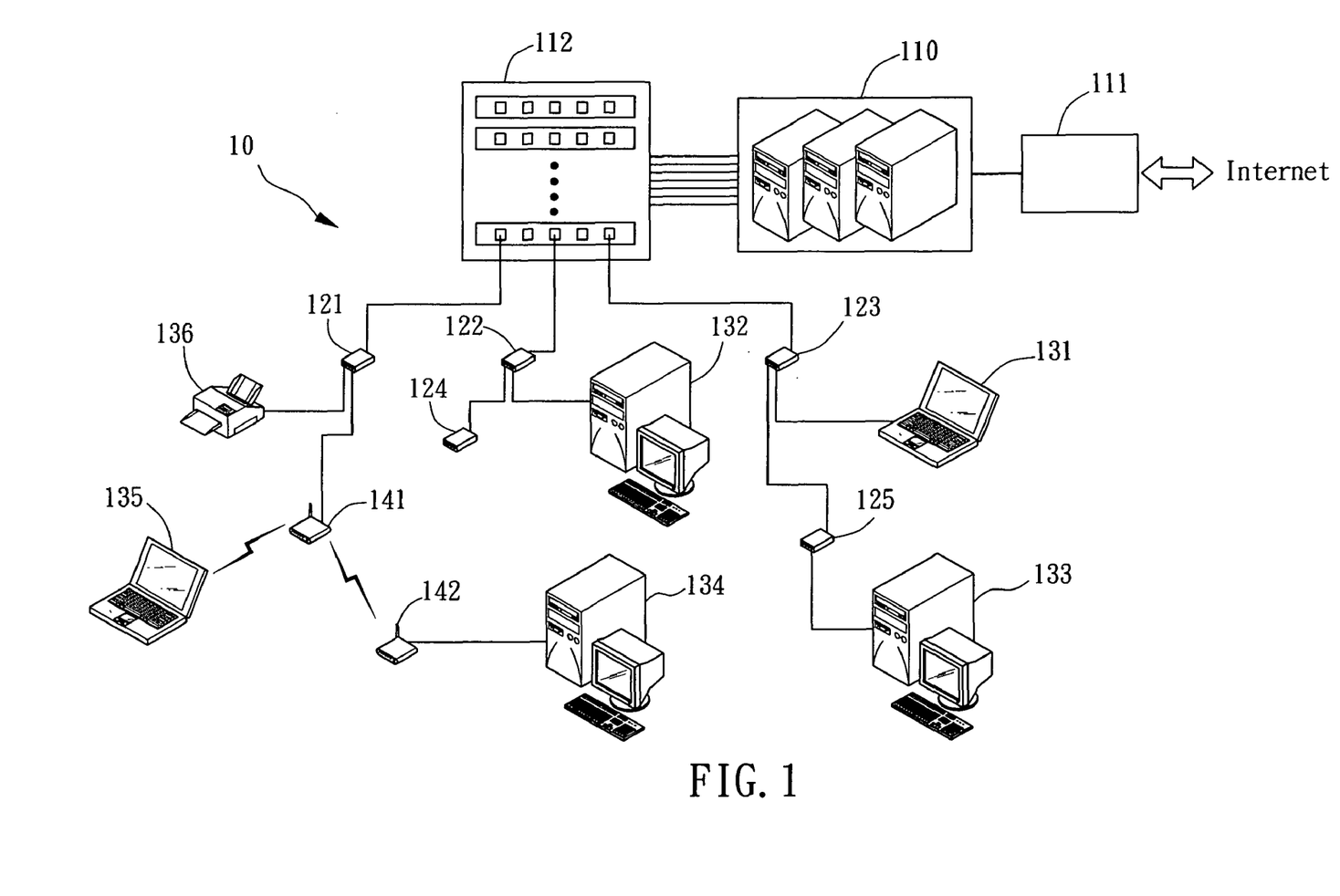
FIG. 1 is a structural view of a network system adopted in an embodiment of the method of preventing unauthorized connection in accordance with the present invention.

Refer to FIG. 1, which shows a structural view of an embodiment of a network system 10 used for preventing unauthorized connection (that is, to Anti-Rogue) in accordance with the present invention. The network system 10 is preferably an Ethernet system compliant with IEEE 802 standard; however, the network system 10 can also be, but not limited to, a wireless area network (WAN), a local area network (LAN) or a wireless local area network (WLAN). In this embodiment, the network system 10 includes one or more server 110. Server 110, on one hand, is connected to the Internet or other network system via an Internet interface 111, such as a router; on the other hand, server 110 is connected to a patch panel 112. Through the various network cable plugged in the patch panel 112, many remote network devices can be connected to server 110 and thus utilize the Internet services, or transmit data interchangeably via network system 10. These network devices can include, but not limited to, hubs or switches 121~125, terminal computer with network connection capabilities 131~135, computer peripheral device 136 that can be connected to the network, access points 141~142, router, network bandwidth sharing device, network management system (NMS), wireless dongle, bridge and network card, etc. These network devices, such as switches 121~125 or access points 141~142, can be directly connected to the patch panel 112, or connected to the patch panel 112 by stacking on another switches 121~125 or access points 141~142.

Figure 2:
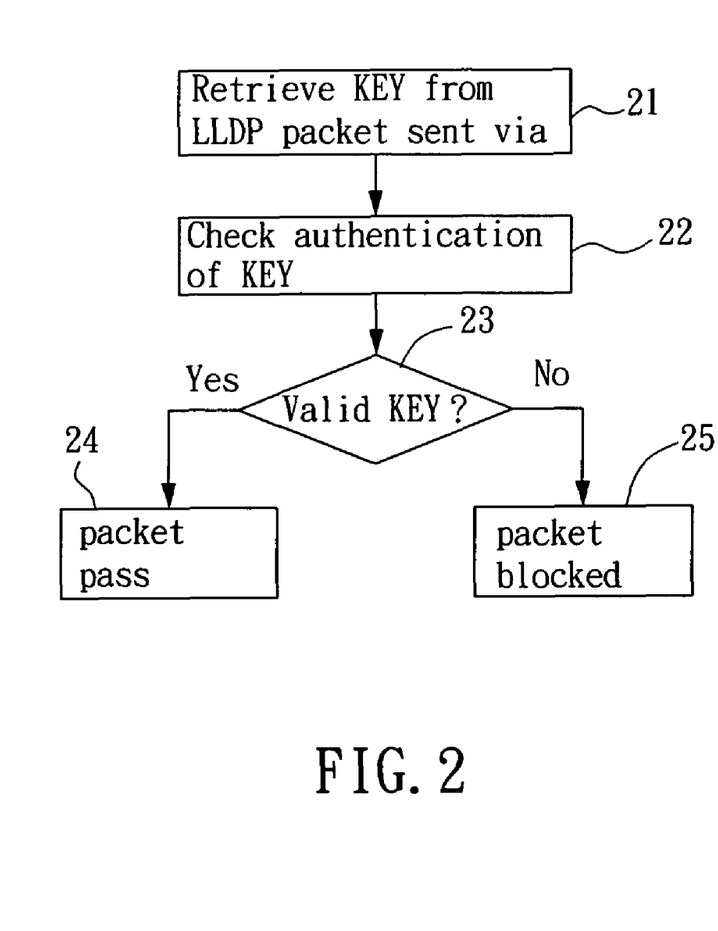
FIG. 2 is a flow chart of an embodiment of receiving authorized packet in the method of preventing unauthorized connection in accordance with the present invention.
Figure 3:
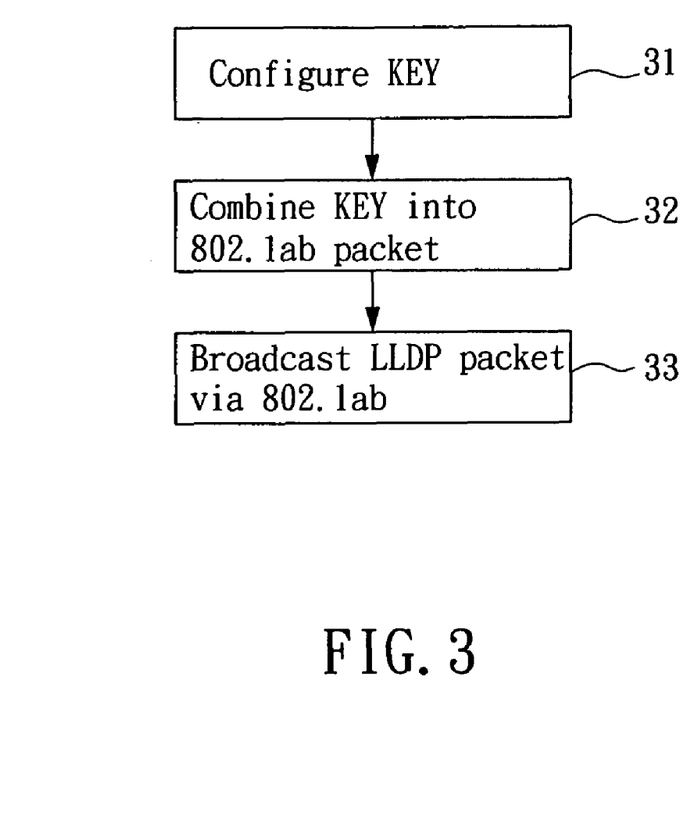
FIG. 3 is a flow chart of an embodiment of sending authorized packet in the method of preventing unauthorized connection in accordance with the present invention.

Refer to FIGS. 2 and 3, which show a flow chart of an embodiment of receiving and sending authorized packets while preventing unauthorized connection in accordance with the present invention. In this embodiment, it is assumed that a first network device (authenticating end) will prevent unauthorized connection in accordance with the present invention so as to verify and authenticate a connection request from a second external network device (requesting end) located in the same network system. In this embodiment, the first network device must be capable of receiving as well as sending authorized packets. For example, the first network device can be, but not limited to, one of the following: hub, switch, access point, router, network bandwidth sharing device, network management device and bridge, either wired or wireless. On the other hand, the second network device can be provided with only the capability of receiving authorized packet or both the capabilities of sending and receiving authorized packets. For example, the second network device can be, but not limited to be, hub, switch, access point, router, network bandwidth sharing device, network management device, network dongle, bridge and network card, either wired or wireless.

As shown in FIG. 2, the steps performed by the first network device with respect to preventing unauthorized connection include:

Step 21: receiving a LLDP (Link Layer Discovery Protocol) packet compliant with IEEE 802.1ab communication protocol that is sent from the second external network device; and analyze the LLDP packet so as to retrieve an authentication key contained in the LLDP packet.

Step 22: checking to see if the authentication key is legitimate (step 23); if the authentication key is a legitimate authentication key, then perform step 24 to allow the packets sent from the second network device to pass through, in other words, allowing the second network device to connect and use the network services. If the authentication key is not present, or if the authentication key is not legitimate, or the transmission of the LLDP packets is expired, then all packets send from the second network device are blocked (step 25), in other words, disallowing the second network device to connect or use network services.

In this embodiment, the aforementioned method to block all packets sent from the second network device is to discard all the packets except a control packet coming from a port corresponding to the second network device such that the communication port is blocked, thereby preventing the second network device from using the network transmission service.

As shown in FIG. 3, the steps of sending authorized packets by the second network device for preventing unauthorized connection in accordance with the present invention include:

Step 31: configuring the content of the authentication key, such as user account or password, etc.

Step 32: combining the authentication key into the LLDP packet compliant to the 802.1ab communication protocol.

Step 33: Through the function of periodic broadcasting of the LLDP packets of the 802.1ab communication protocol, the LLDP packet is broadcasted so as to request connection authentication from other network devices in the network system. Because the second network device will periodically broadcast the LLDP packets under the 802.1ab structure, the first network device can periodically check the legitimacy of the authentication of the second network device so as to determine whether to allow the second network device to utilize the communication port for data transmission. As a result, the verification and authentication mechanism of preventing unauthorized network device from connecting and using transmission services provided by the system is achieved. Additionally, because the present invention is implemented under the 802.1ab communication protocol, hardware with cheaper specification and simple computing capability can be utilized, and thus light-weighted device can be adopted.

Figure 4:
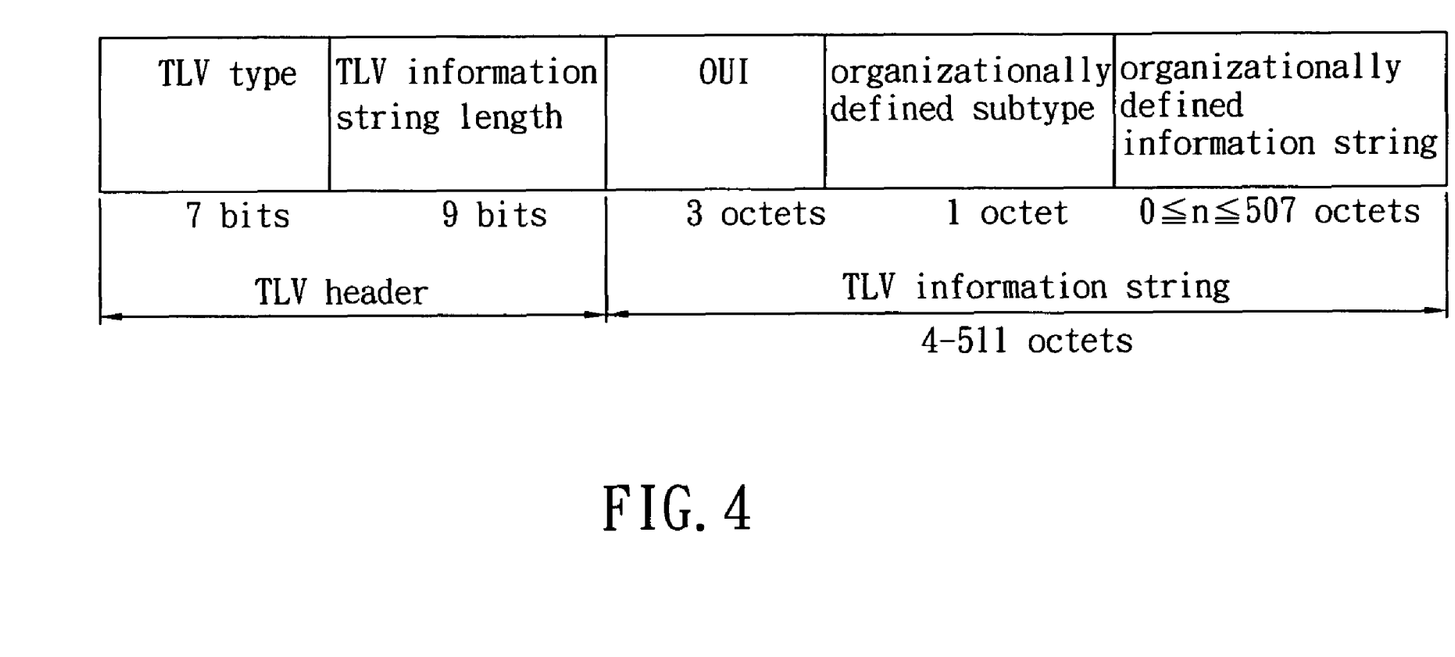
FIG. 4 is an embodiment of the fields contained in the LLDP in the method of preventing unauthorized connection in accordance with the present invention.

Refer to FIG. 4, which shows an embodiment of the fields in the LLDP packet used in the method of preventing unauthorized connection in accordance with the present invention.

In a preferred embodiment of the present invention, the LLDP packet may include two major fields, namely a TLV (Type Length Value) title field and a TLV data stream field. The TLV title field may further include a TLV type field and a TLV data length field. The TLV data stream includes a MAC (Media Access Control) address of the network device and further includes an OUI (Organizationally Unique Identifier) field, an organization configuration subtype field and an organization configuration data stream field; wherein, the authentication key is to encrypt an OUI code of the network device manufacturer with a password and then store it in the TLV data stream Analyzing the TLV data stream of the LLDP packet can therefore calculate the password and verify the legitimacy of the authentication.

Figure 5:
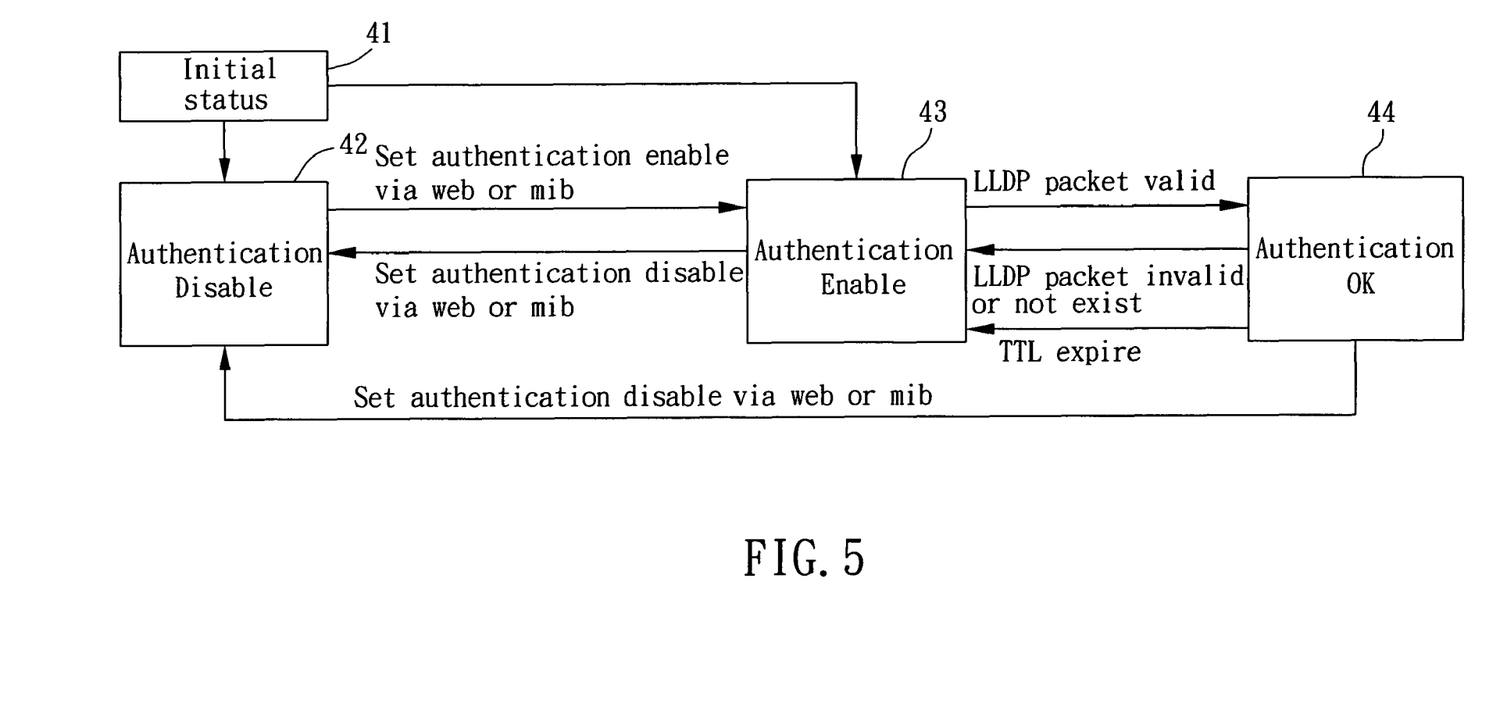
FIG. 5 is a schematic view of an embodiment of the authentication status of the first network device in the method of preventing unauthorized connection in accordance with the present invention.

Refer to FIG. 5, which shows a schematic view of an embodiment of an authentication status of the first network device in the method of preventing unauthorized connection in accordance with the present invention. As shown in FIG. 5, with respect to any of the "initial status 41", the communication ports may be either "disable authentication function 42" or "enable authentication function 43". A network administrator can configure the "initial status 41" of the first network device to one of the two functions, or switch between "disable authentication function 42" or "enable authentication function 43". When in "disable authentication function 42", the first network device will not perform connection verification and authentication task; in other words, the communication device connected to the communication port can utilize network transmission service without authentication. When in "enable authentication function 43", the first network device will disable the connection service of the communication port and perform the connection authentication procedures as illustrated in FIG. 2 on the communication device connected to the communication port. If the LLDP packet received contains a legitimate authentication key, then the status of the communication port is switched to "pass authentication 44", and the network transmission service is allowed. If the LLDP packet is found illegitimate, or the time waiting for the LLDP packet is expired, then the status of the communication port is switched to "enable authentication function 43", and the connection is blocked at the same time. Thus, the communication device connected to the communication port must retransmit the LLDP packet with legitimate authentication key to the first communication device periodically so as to continue using the network service, thereby preventing unauthorized connection.

Figure 6:
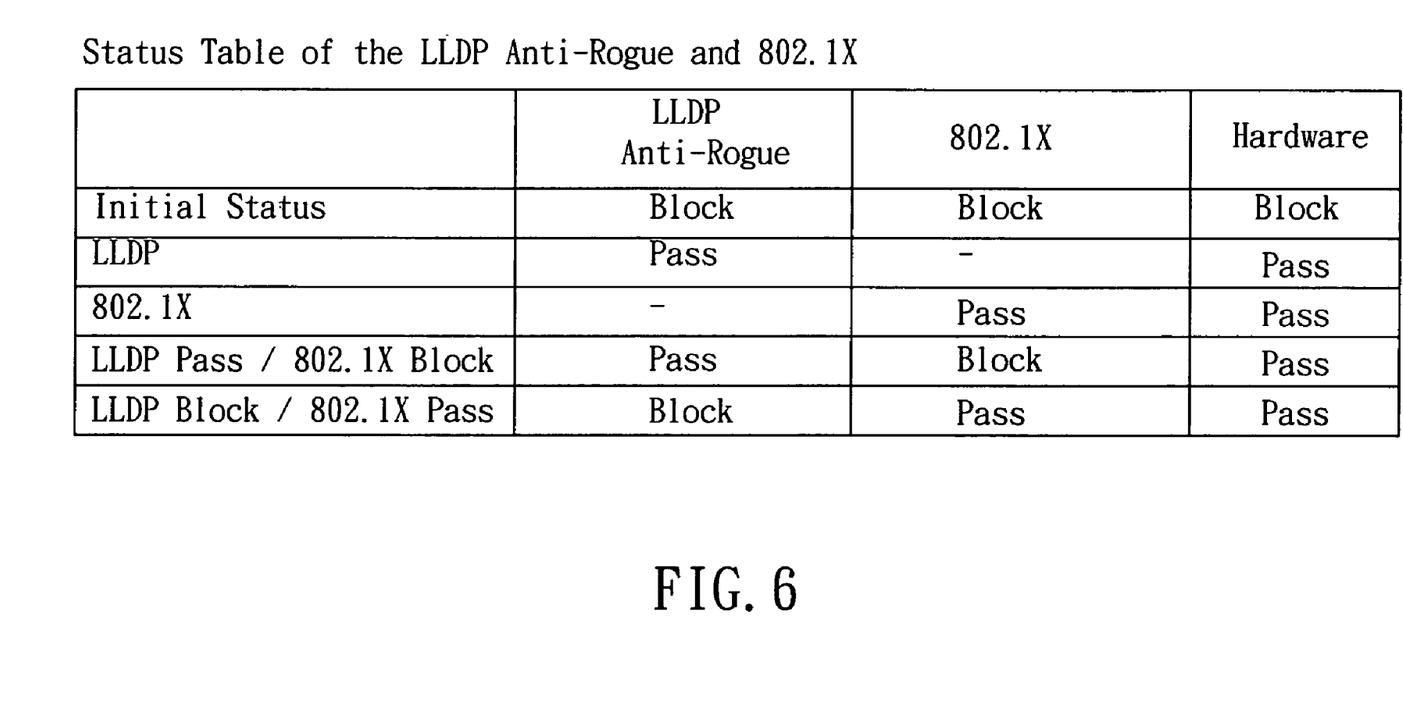
FIG. 6 is the enable status table supporting both the unauthorized LLDP prevention function and the 802.1X authentication function in the method of preventing unauthorized connection in accordance with the present invention.

Refer to FIG. 6, which shows the method of preventing unauthorized connection (Anti-Rogue) in accordance with the present invention supporting the prevention of unauthorized LLDP as well as the enable status table of the 802.1X authentication function. In a preferred embodiment of the present invention, the first network device supports the prevention of the unauthorized LLDP function (under the 802.1ab communication protocol) as well as the authentication function provided by the 802.1X communication protocol. The two functions are both authentication mechanisms established on the basis of the communication port; however, because one hardware communication port can only adopt one communication protocol at a time, the present invention must be implemented in accordance with the table illustrated in FIG. 6, as described below:

1. In the initial status, if the functions of preventing unauthorized LLDP (also referred as "LLDP Anti-Rogue") and 802.1X authentication are both in "block" status, then the status of the hardware communication port will be "block".

2. If the function of preventing unauthorized LLDP is set to "pass", and the 802.1X authentication function does not support such status, then the status of the hardware communication port is "pass".

3. If the status of the 802.1X authentication function is "pass", and the function of preventing unauthorized LLDP does not support such status, then the status of the hardware communication port is "pass".

4. If both functions of preventing unauthorized LLDP and 802.1X authentication are supported, but the status of the preventing unauthorized LLDP function is "pass", while the 802.1X authentication function is "block", then the status of the hardware communication port is "pass".

5. If both functions of preventing unauthorized LLDP and 802.1X authentication are supported, but the status of the preventing unauthorized LLDP function is "block", while the 802.1X authentication function is "pass", then the status of the hardware communication port is "pass".

Figure 7:
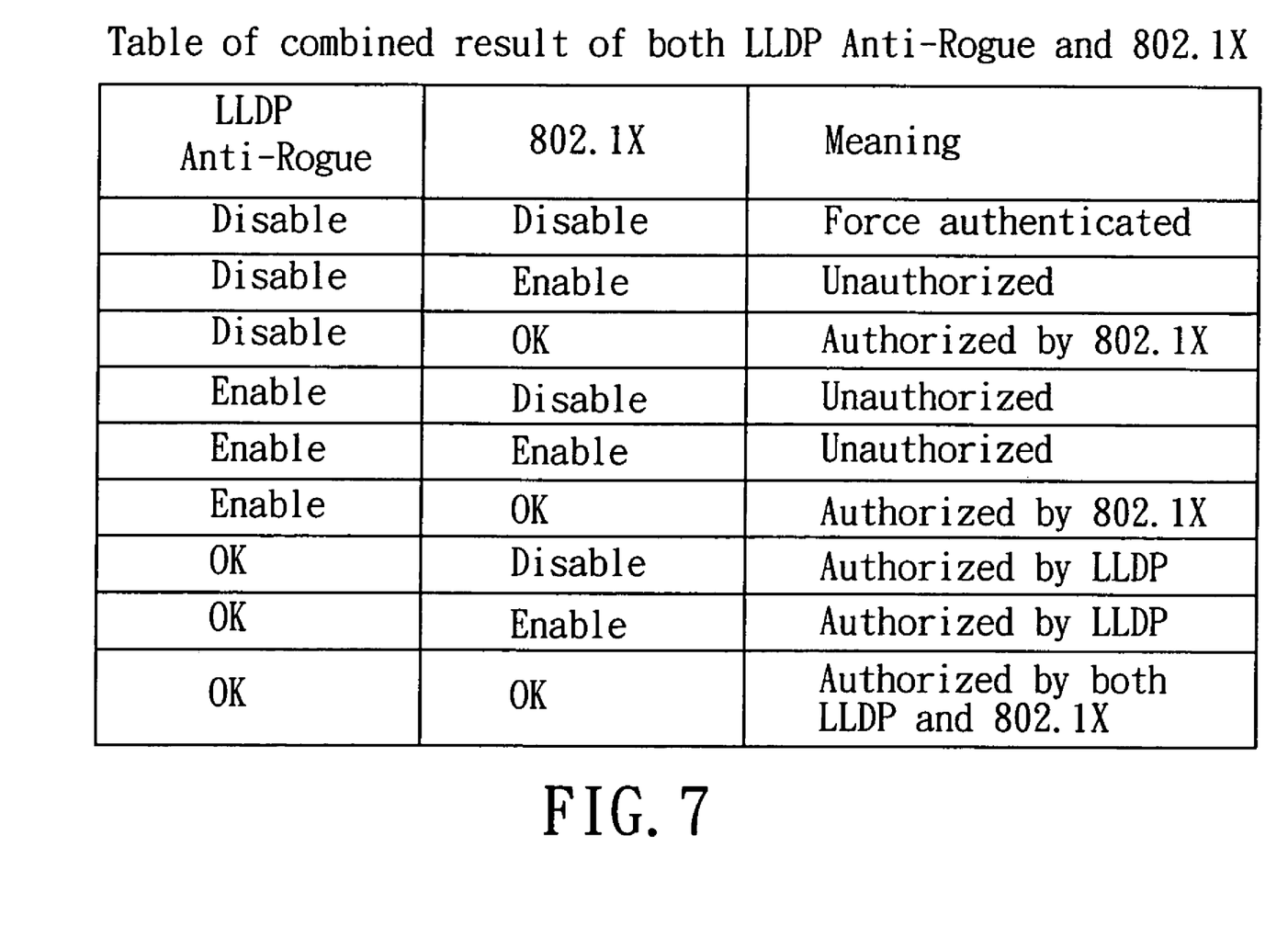
FIG. 7 is a variety of status combination table of the unauthorized LLDP prevention function and the 802.1X authentication function in the method of preventing unauthorized connection in accordance with the present invention.

Refer to FIG. 7, which shows a variety of status combination table of the unauthorized LLDP prevention function as well as the 802.1X authentication function. Because each of the unauthorized LLDP prevention function and the 802.1X authentication function has the three statuses shown in FIG. 4, namely "disable authentication", "enable authentication" and "pass authentication", the meaning of different combinations of the two functions are shown in FIG. 7, as described below:

1. If the status of the unauthorized LLDP prevention function is "disable" and the status of the 802.1X authentication function is also "disable", then it means "force authentication", which means that regardless using the 802.1ab or 802.1X communication protocol, network service can be used without limitation.

2. If the status of the unauthorized LLDP prevention function is "disable", and the status of the 802.1X authentication function is "enable", then it means "no authentication", which means that regardless using the 802.1ab or 802.1X communication protocol, network service is not allowed to use (i.e. network service is blocked).

3. If the status of the unauthorized LLDP prevention function is "disable", and the status of the 802.1X authentication function is "pass", then it means "authenticate with 802.1X", which means that the 802.1X authentication is passed and network service can be used through the 802.1X protocol.

4. If the status of the unauthorized LLDP prevention function is "enable", and the status of the 802.1X authentication function is "disable", then it means "no authentication".

5. If the status of the unauthorized LLDP prevention function is "enable", and the status of the 802.1X authentication function is also "enable", then it means "no authentication".

6. If the status of the unauthorized LLDP prevention function is "enable", and the status of the 802.1X authentication function is also "pass", then it means "authenticate with the 802.1X protocol".

7. If the status of the unauthorized LLDP prevention function is "pass", and the status of the 802.1X authentication function is "disable", then it means "authenticate with LLDP", which means the LLDP authentication of the present invention is passed, and the network service can be used through 802.1ab.

8. If the status of the unauthorized LLDP prevention function is "pass", and the status of the 802.1X authentication function is also "enable", then it means "authenticate with LLDP".

9. If the status of the unauthorized LLDP prevention function is "pass", and the status of the 802.1X authentication function is also "pass", then it means "authenticate with LLDP and 802.1X". At this time, it means that the network device supports the LLDP authentication of 802.1ab as well as the 802.1X authentication simultaneously, and regardless it is 802.1ab or 802.1X communication protocol, network service is allowed. However, in this embodiment, the present invention preferred to use the 802.1X communication protocol.

Figure 8:
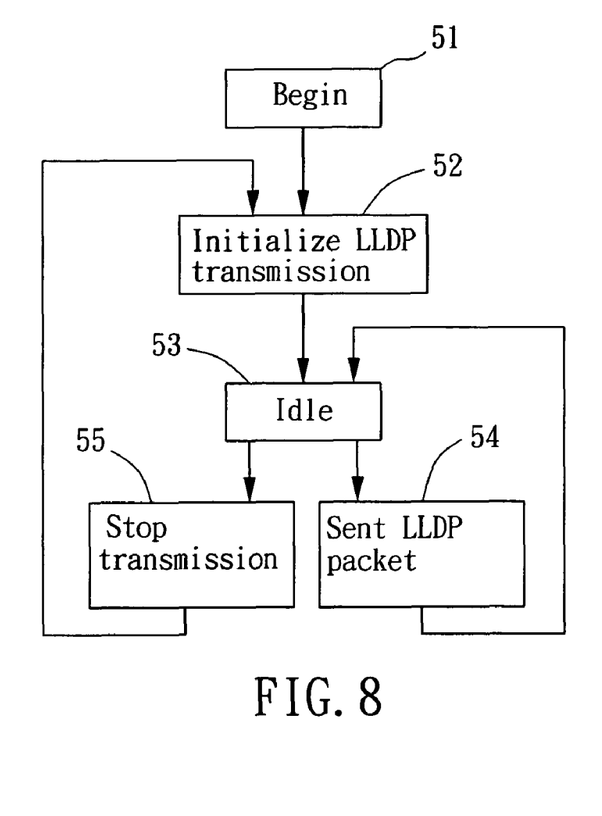
FIG. 8 is a flow chart of the operation of the network device sending authorized packet in the method of preventing unauthorized connection in accordance with the present invention.
Figure 9:
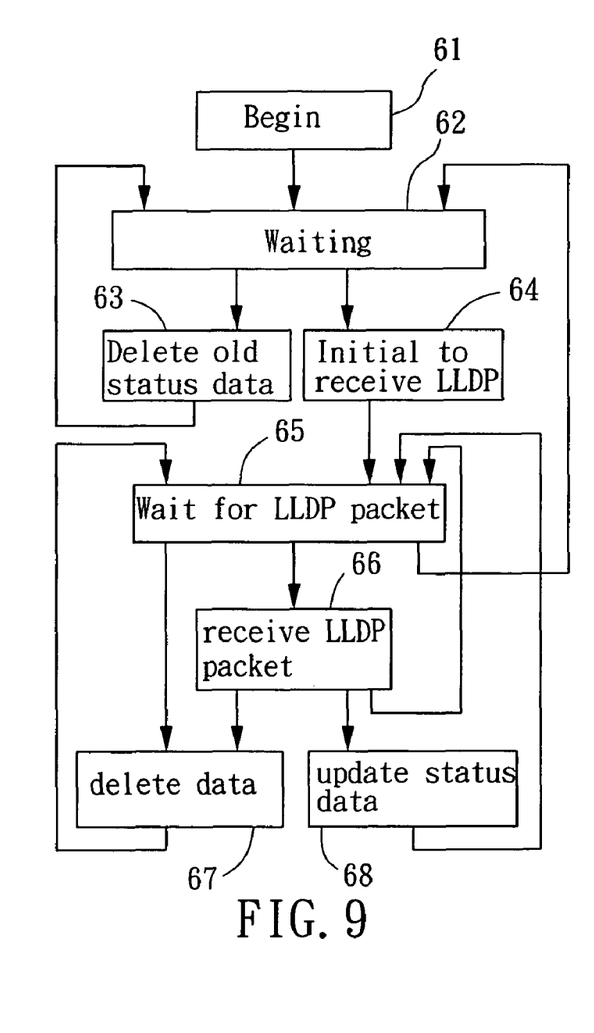
FIG. 9 is a flow chart of the operation of the network device receiving authorized packet in the method of preventing unauthorized connection in accordance with the present invention.

Refer to FIGS. 8 and 9, which show the operation flow charts of the network device sending authorized packet and receiving authorized packet in the method of preventing unauthorized connection in accordance with the present invention, respectively.

As shown in FIG. 8, when the network device of the present invention begins to perform the operation of sending authorized packet (step 51), the LLDP packet is first initialized with the transmission operation (step 52), in other words, step 32 of FIG. 3 is executed. Then, if the status of the device is "enable receiving and sending functions simultaneously" or "enable sending function only", then it is proceeded to waiting (Idle) status (step 53). In the waiting (Idle) status of step 53, timer countdown and connection detection are performed. If the timer is set to a predetermined amount of time, or if the network status is changed, then LLDP packet is sent (step 54), in other words, step 33 of FIG. 3 is performed and then returned to the waiting status of step 53, and timer is reset and detection is performed. In the waiting status of step 53, if the device status is switched to "disable authentication function" or "enable receiving function only", then the signal of stopping transmission is performed (step 55) so as to stop sending LLDP packet, and an amount of time is waited before returning to the initialization of step 52.

As shown in FIG. 9, when the network device of the present invention begins to operate the receiving authorized packet at a certain communication port (step 61), it is first entered into the waiting status of the communication port (step 62). Then, after a longer period, the network device will periodically delete the old status data of the communication port (step 63) and then return to the waiting status of step 62. When the status of the communication port is switched to "enable LLDP packet", then initialization is operated to receive LLDP packet (step 64). Then, the status of the communication port is switched to "enable receiving and sending function simultaneously" or "enable receiving function only" and waits for LLDP packet (step 65). At this time, if the status of the communication port is again switched to "disable authentication function" or "enable sending function only", then it is returned to step 62 to the waiting status. During the operation of waiting LLDP packet in step 65, if the packet attempts to transmit from the communication port, step 66 of receiving LLDP packet is performed. At this time, if the packet received is illegitimate, did not pass authentication, or is received in error, then the packet is discarded and the operation is returned to step 65 to wait for LLDP packet. On the other hand, if the packet received is legitimate, then the packet is accepted and at the same time it is given a time to live TTL, and when the receiving status is not changed, then the operation is returned to step 65 to wait for LLDP packet. If the packet received is legitimate (and thus accepted) and the time to live TTL is reached, and the receiving status is changed, the step 68 is performed so as to update status data and then return to step 65 to wait for LLDP packet. Additionally, in step 66 of receiving LLDP packet, every time the TTL is passed, step 67 will be performed periodically to delete data, and step 65 of waiting for LLDP packet is returned to, after deleting status data. Furthermore, in step 65 of waiting for LLDP packet, after a longer period of time, the network device will also delete the old status data of the communication port periodically (step 67) and then returned to step 65 of waiting status.

While the invention has been described by way of examples and in terms of the preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures. Accordingly, that above disclosure should be construed as limited only by the metes and bounds of the appended claims.

What is claimed is:

1. A method for preventing unauthorized connection in a network system performed in a first network device, said method of preventing unauthorized connection comprising:

receiving a LLDP packet compliant with an 802.1ab communication protocol transmitted from an external second network device;

analyzing said LLDP packet and checking to see if said LLDP packet containing a legitimate authentication key; and if said authentication key being absent or illegitimate, then blocking all packets transmitted from said second network device; and, if said legitimate authentication key being found, then allowing all packets transmitted from said second network device to pass;

wherein said LLDP packet comprises the following fields: a TLV title and a TLV data stream; said TLV data stream includes a MAC address of said second network device and said authentication key is contained in said TLV data stream.

2. The method of preventing unauthorized connection according to claim 1, wherein said first network device further performs an authentication key transmitting procedure, said authentication key transmitting procedure comprising the following steps:

setting a content of said authentication key;

combining said authentication key into a LLDP packet compliant with an 802.1ab communication protocol; and broadcasting said LLDP packet via said 802.1ab communication protocol.

3. The method of preventing unauthorized connection according to claim 1, wherein said TLV title further includes a TLV type field and a TLV data length field; and said TLV data stream further includes an OUI field and an organization configuration subtype field and an organization configuration data stream field; wherein said authentication key encrypts an OUI code of a network device manufacturer with a password and then stores in said TLV data stream, and said password can be calculated by analyzing said TLV data stream of said LLDP packet.

4. The method of preventing unauthorized connection according to claim 1, wherein said first network device supports said 802.1ab communication protocol and an 802.1x communication protocol simultaneously.

5. The method of preventing unauthorized connection according to claim 1, wherein said first network device is one of the following devices: hub, switch, access point, router, a bandwidth sharing device, network management device and bridge.

6. The method of preventing unauthorized connection according to claim 1, wherein said second network device is one of the following devices: hub, switch, access point, router, network bandwidth sharing device, network management device, network dongle, a bridge and network card.

7. The method of preventing unauthorized connection according to claim 1, wherein said step of blocking all packets transmitted from said second network device is accomplished by discarding all packets except a control packet sent from a communication port corresponded to said second network device.

8. A method for preventing unauthorized connection method in a network system, said method comprising the following steps:

configuring a content of an authentication key in a network device;

combining said authentication key into a LLDP packet compliant with an 802.1ab communication protocol; and broadcasting said LLDP packet via said 802.1ab communication protocol periodically so as to request other network devices for a connection authentication;

wherein said LLDP packet comprises the following fields: a TLV title and a TLV data stream; said TLV data stream includes a MAC address of said network device and said authentication key is contained in said TLV data stream.

9. The method of preventing unauthorized connection according to claim 8, wherein said TLV title further includes a TLV type field and a TLV data length field; and said TLV data stream further includes an OUI field and an organization configuration subtype field and an organization configuration data stream field; wherein said authentication key encrypts an OUI code of a network device manufacturer with a password and then stores in said TLV data stream, and said password can be calculated by analyzing said TLV data stream of said LLDP packet.

* * * * *